United States Patent
Kim

(10) Patent No.: US 9,348,756 B2
(45) Date of Patent: *May 24, 2016

(54) ACTIVE MEMORY PROCESSOR SYSTEM

(71) Applicant: IP Cube Partners (ICP) Co., Ltd., Seoul (KR)

(72) Inventor: Moon J. Kim, Palo Alto, CA (US)

(73) Assignee: IP Cube Partners (ICP) Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,153

(22) Filed: Oct. 24, 2014

(65) Prior Publication Data

US 2015/0046660 A1    Feb. 12, 2015

Related U.S. Application Data

(63) Continuation of application No. 14/143,494, filed on Dec. 30, 2013, now Pat. No. 8,874,847, and a continuation of application No. 12/952,413, filed on Nov. 23, 2010, now Pat. No. 8,621,151.

(51) Int. Cl.
*G06F 12/08* (2006.01)

(52) U.S. Cl.
CPC ........ *G06F 12/0884* (2013.01); *G06F 12/0806* (2013.01); *G06F 12/0831* (2013.01); *G06F 12/0833* (2013.01); *G06F 12/0835* (2013.01); *G06F 12/0877* (2013.01); *G06F 2212/6012* (2013.01); *G06F 2212/62* (2013.01); *G06F 2212/621* (2013.01)

(58) Field of Classification Search
CPC ............ G06F 12/0806; G06F 12/0831; G06F 12/0833; G06F 12/0835; G06F 12/0877; G06F 12/0884; G06F 2212/6012; G06F 2212/62; G06F 2212/621
USPC ........................................................ 711/118
See application file for complete search history.

(56) References Cited

U.S. PATENT DOCUMENTS

2010/0299553 A1    11/2010  Cen

OTHER PUBLICATIONS

"Active memory processor", www.google.com/search, Dated Aug. 12, 2013, 1 page.
Yong J. Choe, USPTO Notice of Allowance and Fee(s) Due, U.S. Appl. No. 14/143,494, Date Mailed Jun. 24, 2014, 20 pages.
Yong J. Choe, USPTO Office Action, U.S. Appl. No. 12/952,413, Notification Date Feb. 20, 2013, 12 pages.
Yong J. Choe, USPTO Final Office Action, U.S. Appl. No. 12/952,413, Notification Date Jun. 6, 1013, 10 pages.
Yong J. Choe, USPTO Notice of Allowance and Fee(s) Due, U.S. Appl. No. 12/952,413, Date Mailed Aug. 23, 2013, 14 pages.
Yong J. Choe, USPTO Office Action, U.S. Appl. No. 14/726,820, Notification Date Jun. 26, 2015, 11 pages.

*Primary Examiner* — Yong Choe
(74) *Attorney, Agent, or Firm* — Madeline F. Schiesser; Keohane & D'Alessandro, PLLC

(57) ABSTRACT

In general, the present invention relates to data cache processing. Specifically, the present invention relates to a system that provides reconfigurable dynamic cache which varies the operation strategy of cache memory based on the demand from the applications originating from different external general processor cores, along with functions of a virtualized hybrid core system. The system includes receiving a data request, selecting an operational mode based on the data request and a predefined selection algorithm, and processing the data request based on the selected operational mode.

16 Claims, 7 Drawing Sheets

ACTIVE MEMORY PROCESSOR SYSTEM

CROSS-REFERENCE TO RELATED APPLICATION

This application is a continuation of, and claims the benefit of, co-pending and co-owned U.S. patent application Ser. No. 14/143,494 filed Dec. 30, 2013, entitled "ACTIVE MEMORY PROCESSOR SYSTEM", the entire contents of which are incorporated herein by reference. U.S. patent application Ser. No. 14/143,494 is a continuation of co-owned U.S. patent application Ser. No. 12/952,413, filed Nov. 23, 2010, now U.S. Pat. No. 8,621,151, the entire contents of which are incorporated herein by reference.

TECHNICAL FIELD

The present invention relates to data cache processing. Specifically, the present invention relates to a system that provides reconfigurable dynamic cache which varies the operation strategy of cache memory based on the demand from the applications originating from different external general processor cores, along with functions of a virtualized hybrid core system.

BACKGROUND

The performance of memory-intensive applications is often limited by how fast the memory system can provide needed data. Latency between processors and memory is often the performance bottleneck in application performance. Multiple processor cores require highly efficient cache operation with wide memory bandwidth.

In today's world, digital system performance and complexity are continually increasing due to technology scaling and three-dimensional (3D) integration. Current designs stick to conventional cache approaches. On-demand, on-chip memory support is critical to make the most of these developments. As the gap widens between processor speed and memory access time, the need to overhaul cache architecture to keep up with digital system development trends becomes apparent.

SUMMARY

In general, embodiments of the invention relate to processing a data request in a caching system. Specifically, a system is presented that provides reconfigurable dynamic cache which varies the operation strategy of cache memory based on the demand from the applications originating from different external general processor cores, along with functions of a virtualized hybrid core system. The system includes receiving a data request, selecting an operational mode based on the data request and a predefined selection algorithm, and processing the data request based on the selected operational mode.

In one embodiment, there is a method for processing a data request in a caching system. In this embodiment, the method comprises: receiving a data request; selecting from at least one operational mode based on the data request and a predefined selection algorithm; processing the data request based on the selected operational mode, returning a response to the sender; monitoring the selecting activity, analyzing the selecting activity, and dynamically updating the selection algorithm based on the analysis.

In a second embodiment, there is a system for processing a data request in a caching system. In this embodiment, the system comprises: a memory processing element, comprising: a cache memory, comprising a plurality of memory blocks; a front end coupled to cache memory by at least one bus, comprising: an input/output component configured to receive a data request and return a response to the sender; a controller component configured to: select from at least one operational mode based on the data request and a predefined selection algorithm; and process the data request based on the selected operational mode. The system further comprises a memory processing core, comprising: a front end manager component configured to monitor front end activity, analyze the front end activity, and dynamically update the selection algorithm based on the front end activity analysis.

In a third embodiment, there is a computer-readable medium storing computer instructions which, when executed, enables a computer system to process a data request in a caching system, the computer readable medium comprising: program code for causing a computer system to: receive a data request; select from at least one operational mode based on the data request and a predefined selection algorithm; process the data request based on the selected operational mode, return a response to the sender; monitor the selecting activity, analyze the selecting activity, and dynamically update the selection algorithm based on the analysis.

In a fourth embodiment, there exists a method for processing a data request in a caching system. In this embodiment, a computer infrastructure is provided and is operable to: receive a data request; select from at least one operational mode based on the data request and a predefined selection algorithm; process the data request based on the selected operational mode, return a response to the sender; monitor the selecting activity, analyze the selecting activity, and dynamically update the selection algorithm based on the analysis.

BRIEF DESCRIPTION OF THE DRAWINGS

These and other features of this invention will be more readily understood from the following detailed description of the various aspects of the invention taken in conjunction with the accompanying drawings in which.

Figure 1:
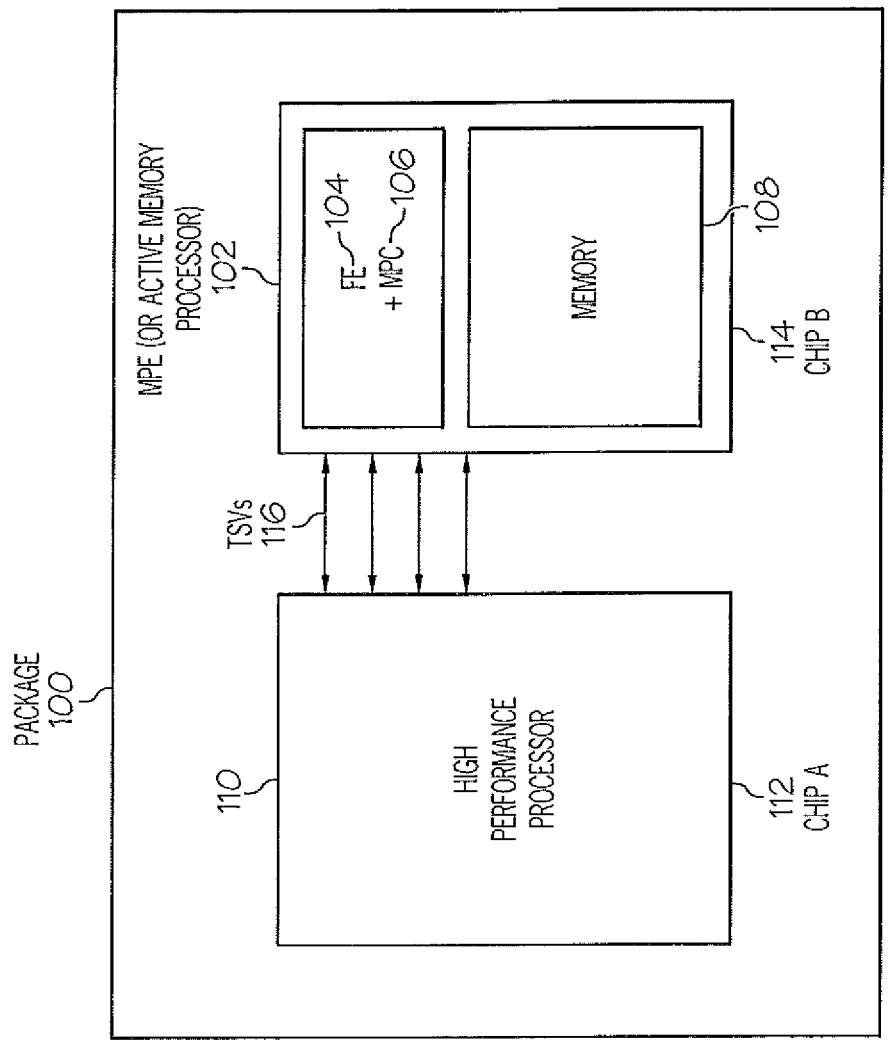
FIG. 1 illustrates a high-performance processor and active memory processor.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an active memory processor system and method. Specifically, this invention allows new functions of a virtualized hybrid core system and reconfigurable dynamic cache which varies the operation strategy of cache memory based on the demands of applications originating from different external general processor cores.

Cache is a temporary storage area where frequently used data can be stored for rapid access. When a processor needs to read from or write to a location in main memory, it first checks to determine if a copy of that data resides in cache. If so, the processor reads from or writes to the cache, which is much faster than accessing main memory. In other words, the more requests that can be served by cache, the faster the overall system performance will be.

Referring now to FIG. 1, a high-performance processor and active memory processor is shown. Package 100 (or chip carrier) houses Chip A 112 and Chip B 114. High performance processor 110 resides on Chip A 112. MPE (or memory processing element) 102 resides on Chip B 114. MPE 102 includes front end (FE) 104 and memory processing core (MPC) 106. Chip A 112 and Chip B 114 are connected with a set of TSVs 116. A TSV, or through-silicon-vias, is a vertical electrical connection (via) passing completely through a thin slice or rectangle of silicon. The components of MPE 102 are discussed in detail below.

Figure 2:
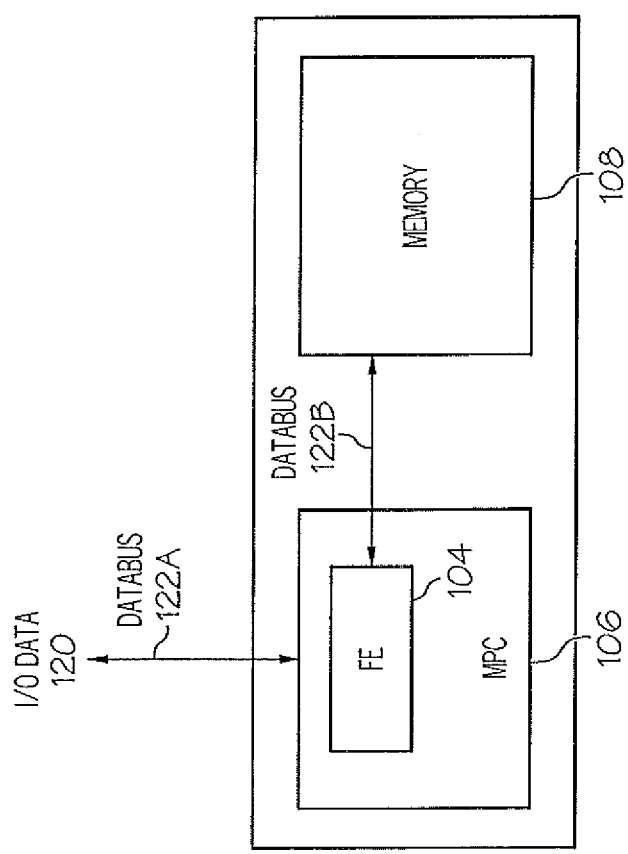
FIG. 2 illustrates a more detailed view of a memory processing element.

FIG. 2 depicts a more detailed view of MPE 102. FE 104 receives read/write requests from a plurality of processors and returns applicable responses (I/O 120) via databus 122A. A databus is a subsystem that transfers data between components. FE 104 communicates with memory 108 via databus 122B.

Figure 3A:
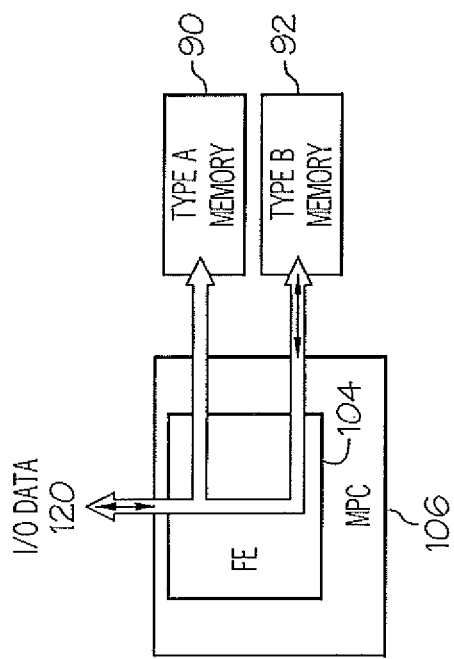
FIGS. 3A and 3B illustrate schematic diagrams of a memory processing element with heterogeneous memory.
Figure 3B:
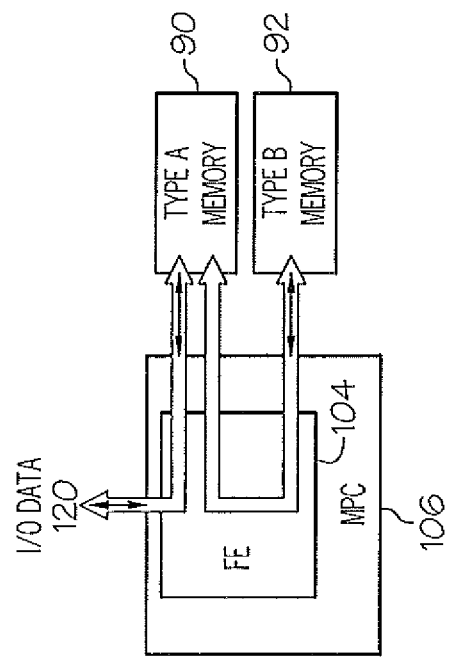

FIG. 3A and FIG. 3B depict schematic diagrams of MPE 102 (FIG. 1) with heterogeneous memory 108. Memory 108 consists of type A memory 90 and type B memory 92. MPE 102 is capable of supporting a plurality of memory types which are coupled to MPC 106 via one or more databuses. In FIG. 3A, MPC 106 searches only type B memory 92 for data request (I/O) 120. In FIG. 3B, MPC 106 searches both type A memory 90 and type B memory 92 for data request 120. MPC 106 registers memory types, size, and real performance. Memory block relationships are defined by MPC 106.

Figure 4:
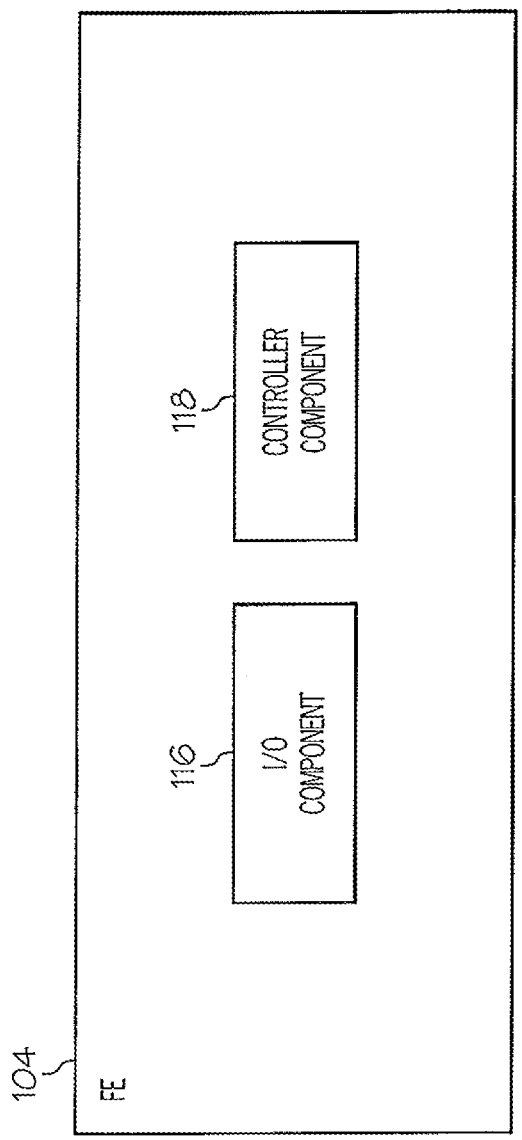
FIG. 4 illustrates a more detailed view of a memory front end.

FIG. 4 depicts a more detailed view of FE 104. FE 104 includes I/O component 116 and controller component 118. FE 104 has two primary responsibilities: (1) managing the flow of data requests and responses, and (2) forwarding each data request that is received using the correct cache mode (described in detail below). I/O component 116 handles all input/output traffic. Controller component 118 handles the processing of each data request. The functions of FE 104 and its components are noted and described below in terms of the process schematic diagram of FIG. 5.

Figure 5:
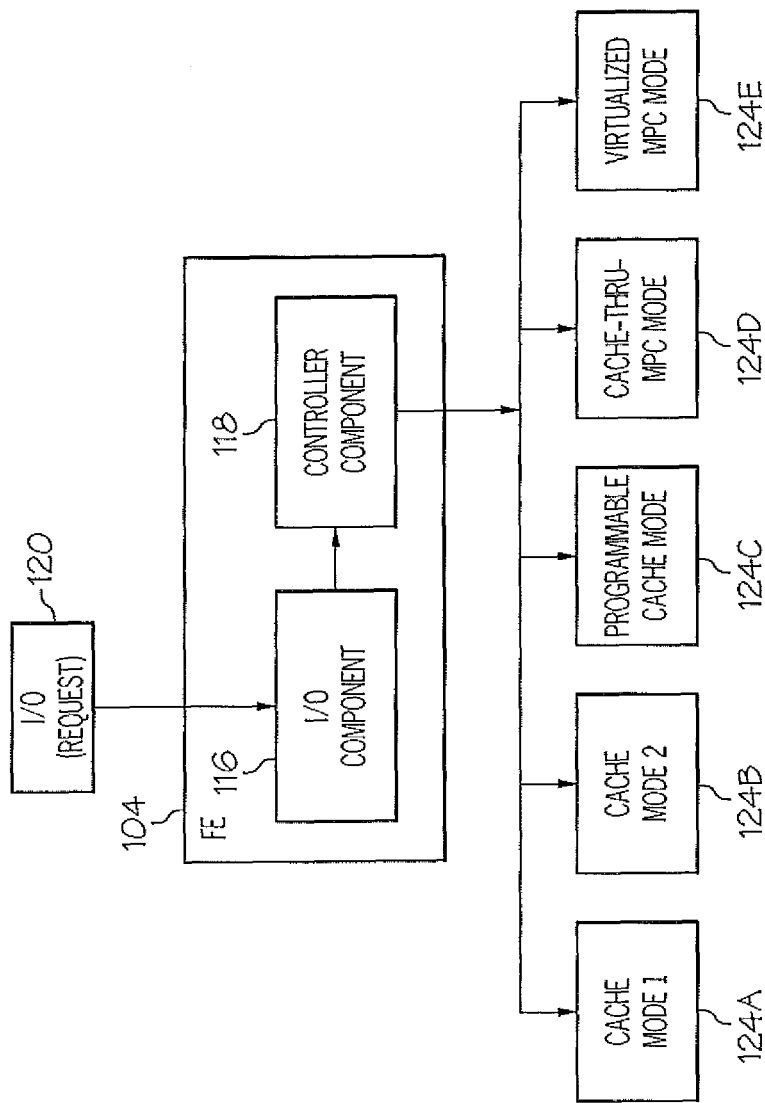
FIG. 5 illustrates a schematic process diagram of a memory front end.

FIG. 5 depicts a process schematic diagram of FE 104. I/O component 116 receives a data request from a processor. Controller component 118 performs data request 120 utilizing (at least) one of the following options based on the type of request and application demands: cache modes 1 or 2 (124A, 124B), parametric programmable cache mode (124C), MPC for Cache-Thru-MPC mode (124D), and virtualized MPC mode (124E) for processing. MPC 106 (FIG. 1) partitions memory blocks and assigns the memory blocks to the FE 104 modes.

If the selected option is cache modes 1 or 2 (124A, 124B), or parametric programmable cache mode (124C), then the data request is a cache search request which is performed by controller component 118. If the selected option is MPC for Cache-Thru-MPC mode (124D) or virtualized MPC mode (124E), then the data request is forwarded to MPC 106 for processing. The modes listed are illustrative only and not intended to be limiting. Additional modes may be used within the system and methods described herein.

The first option includes cache mode 1 and cache mode 2 (124A, 124B). Cache modes 1 and 2 operate in a similar manner. Controller component 118 performs the cache search based on the request and the selected mode. If the data is contained in the cache (cache hit), then the request is served by reading the cache. If the data is not contained in cache (cache miss), a fetch is initiated to fetch the data from the next level cache (either internal or external). Cache modes 1 and 2 (124A, 124B) are each pre-programmed modes having several fixed cache operation scenarios and logic. Each is configured using commonly used settings relating to how the cache is arranged internally to store the cached data to increase the effectiveness of the cache.

The second option is parametric programmable cache mode 124C. Like cache modes 1 and 2 (124A, 124B), a cache search is performed based on the request and the caching logic of programmable cache mode 124C. Controller component 118 returns the result (cache hit) or generates a cache miss to fetch the next level cache (either internal or external). However, unlike the earlier detailed cache modes, programmable cache mode 124C is not pre-programmed. This mode accepts parameters from MPC 106 and alters its caching logic based on the received parameters. A programmable cache mode is desirable because it offers inherent flexibility by permitting the selection and/or modification of cache settings.

The third option is cache-thru-MPC mode 124D. In this mode, FE 104 forwards the cache request directly to MPC 106. MPC 106 is configured to use its own caching strategy based on the request. MPC 106 performs the cache operation itself and returns the result to the sender of the request.

The fourth option is virtualized MPC mode 124E. in this mode, FE 104 forwards the data request directly to MPC 106. The data request under this mode is not a cache request, but a request for data processing. This option allows for MPC 106 to process virtualized threads requested from external cores as part of a hybrid and multi-core system. MPC 106 and its functions, including cache-thru-MPC mode 124D and virtualized MPC mode 124E, are discussed in detail below.

Figure 6A:
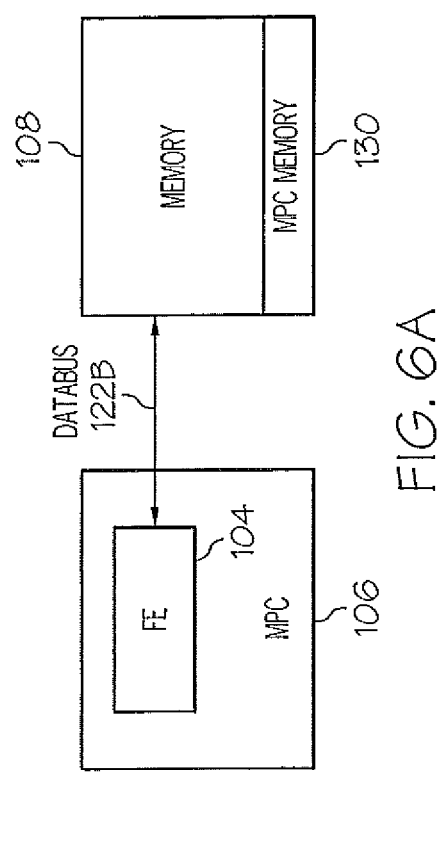
FIGS. 6A and 6B illustrate schematic diagrams including memory processing core memory.
Figure 6B:
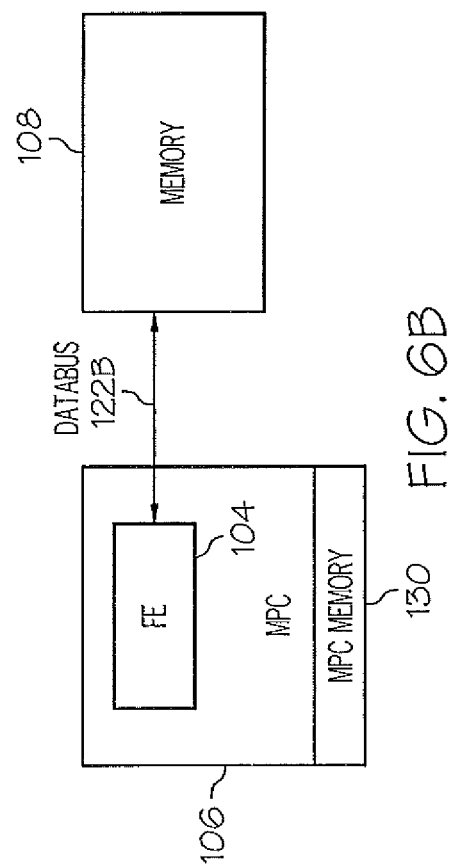

MPC 106 has multiple functions. To perform its functions, MPC 106 requires memory. As depicted in FIGS. 6A and 6B, MPC memory 130 can reside inside or outside of the assigned cache memory block. In FIG. 6A, MPC memory 130 is a portion of the assigned cache memory block. In FIG. 6B, MPC memory 130 is a separate memory block attached to MPC 106.

Figure 7:
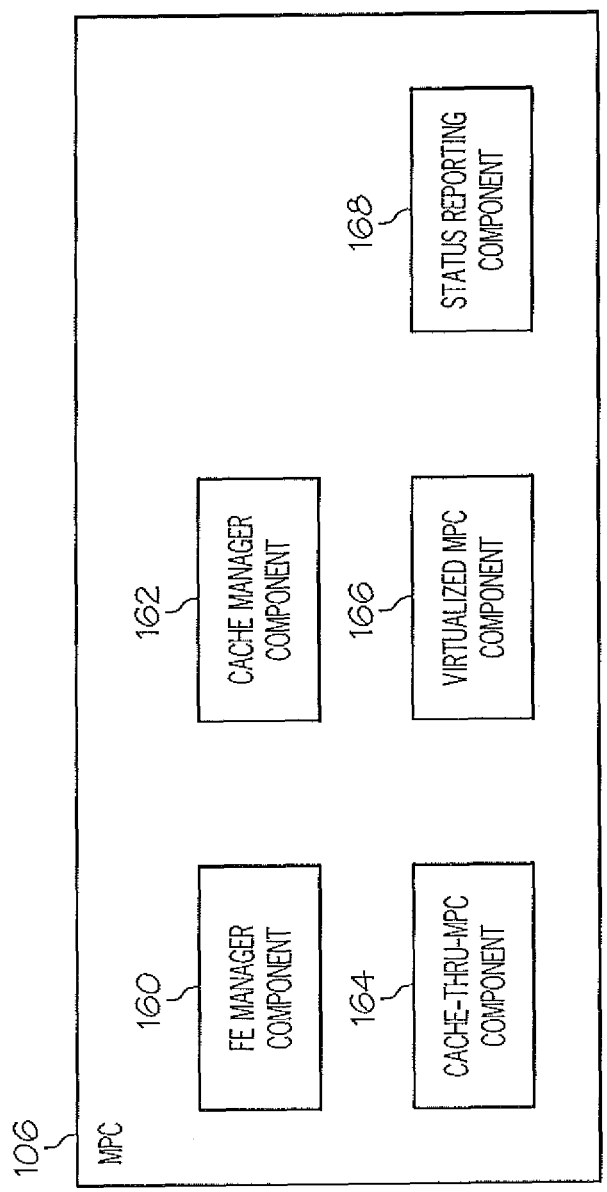
FIG. 7 illustrates a more detailed view of a memory processing core.

FIG. 7 depicts a detailed view of MPC 106. MPC 160 includes FE manager component 160, cache manager component 162, cache-thru-MPC 164 component, virtualized MPC 166 component, and status report component 168. FE manager component 160 and cache manager component 162 control caching operations by dynamically reconfiguring FE 104 behavior and dynamically adjusting cache memory 108 configuration.

FE manager component 160 monitors FE 104 activity, analyzes FE 104 trends and patterns, and updates FE 104 programmable strategies in order to make processing more efficient. FE manager component 160 controls caching strategies by controlling FE 104 cache modes. FE manager component 160 makes cache strategy decisions based on performance and power variation. The performance of cache can be quantified by the speed of the cache subsystem, along with hit and miss rates.

MPC 106 monitors cache behavior, analyzes cache behavior, and is capable of reconfiguring cache dynamically in real-time based on the demand from the applications originating from different external general processor cores. Cache manager component 162 is configured to make changes to cache size, association, and manner, when necessary. Although increasing or reconfiguring cache size, associativity, and manner can improve the cache hit rate, it can make cache access time longer. It is the job of cache manager component 162 to find a workable balance. Cache manager component 162 is further configured to dynamically control the settings of programmable cache mode 124C through parameters. The settings relate to how the cache is arranged internally.

Cache-thru-MPC component 164 receives a cache request from FE 104. Cache-thru-MPC component 164 is configured to use its own caching strategy when serving the request. Caching strategies under cache-thru-MPC mode are configurable and are programmed into Cache-thru-MPC component 164. Cache-thru-MPC component 164 performs the cache operation itself and returns the result to the sender of the request.

Virtualized MPC component 166 operates as a generic processor with a large and fast memory. The goal of virtualized processing by virtualized MPC component 166 is to reduce the number of transactions that are required to be processed. In other words, the purpose of virtualized MPC mode 124E is to combine many simple read/write operations into one operation which is performed by the MPC. Virtualized MPC component 166 is pre-programmed to handle custom types of transactions which are performed on the memory side.

For example, processor A1 has a memory intensive job it is performing. Processor A1 sends a request to MPC 106 to perform a virtualized thread for processor A1 with a block of memory assigned for virtual thread of processor A1. Rather than being a cache for processor A1, MPC 106 directly performs the processor's operation, making the processing more efficient. Still, the processor can have cache relations with MPC 106, and MPC 106 can still serve other cores with remaining memory. In this example, processor A1 sees MPC 106 as a cache and a sub-processor at the same time.

Status reporting component 168 transmits status information to external entities. For example, MPC 106 wants other processor cores and MPCs to know that MPC 106 is not just a cache block, but also a memory processing core (MPC). External entities include other cores and MPCs that share databus 122A. There are several methods for reporting including using: (1) a hybrid databus with data abstraction; (2) a double-acting MPC as a cache and a sub-processor; and (3) an MPE that collects MPE 106 status information. MPC 106 responds to other processor cores as if it is a cache and a processor at the same time. MPC 106 status is exchanged and recognized by observing cache and processor entities.

It should be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context, mean any expression, in any language, code, or notation, of a set of instructions intended to cause a system having an information processing capability to perform a particular function either directly or after either or both of the following: (a) conversion to another language, code, or notation; and/or (b) reproduction in a different material form.

As indicated, the embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for processing a data request in a memory control system, comprising:
   receiving a data request;
   selecting an operational mode from a set of operational modes based on the data request and a predefined selection algorithm, the selected operational comprising a programmable mode;
   receiving at least one parameter for the programmable mode;

modifying caching logic of the programmable mode based on the received at least one parameter;
processing the data request based on the modified caching logic;
returning a response to the sender;
monitoring the selecting activity;
analyzing the selecting activity; and
dynamically updating the selection algorithm based on the analysis.

2. The method of claim 1, wherein the processing step includes performing a cache search.

3. The method of claim 1, further comprising:
calculating the at least one parameter based on caching activity of the programmable mode; and
passing the at least one parameter to a front end of a memory processing element.

4. The method of claim 1, further comprising:
monitoring caching activity;
analyzing the caching activity; and
dynamically reconfiguring cache memory based on the caching activity analysis.

5. The method of claim 1, wherein at least one of the set of operational modes is configured to forward the data request to the memory processing core.

6. The method of claim 1, further comprising receiving the data request from the front end.

7. The method of claim 1, further comprising performing a cache search, when the data request is a cache search request.

8. The method of claim 1, further comprising processing the data request, when the data request is a processor request.

9. A system for processing a data request in a memory control system, comprising:
a memory processing element, comprising:
 a cache memory, comprising a plurality of memory blocks;
 a front end coupled to cache memory by at least one bus, comprising:
  an input/output component configured to receive a data request and return a response to the sender;
  a controller component configured to:
   select an operational mode from a set of operational modes based on the data request and a predefined selection algorithm, the selected operational mode comprising a programmable mode;
   receive at least one parameter for the programmable mode;
   modify caching logic of the programmable mode based on the received at least one parameter; and
   process the data request based on the modified caching logic; and
a memory processing core, comprising:
 a front end manager component configured to monitor front end activity, analyze the front end activity, and dynamically update the selection algorithm based on the front end activity analysis.

10. The system of claim 9, wherein the data request is a cache search request and the processing comprises a cache search performed based on the modified caching logic.

11. The system of claim 9, the memory processing core further configured to:
calculate the at least one parameter based on the caching activity of the programmable mode; and
pass the at least one parameter to the front end.

12. The system of claim 9, the memory processing core further comprising: a cache manager component configured to monitor caching activity, analyze the caching activity, and dynamically reconfigure cache memory based on the caching activity analysis.

13. The system of claim 9, wherein at least one of the set of operational modes is configured to forward the data request to the memory processing core.

14. The system of claim 9, the memory processing core further configured to receive the data request from the front end.

15. The system of claim 14, the memory processing core further configured to perform a cache search, when the data request is a cache search request.

16. The system of claim 14, the memory processing core further configured to process the data request, when the data request is a request for data processing.

* * * * *